(12) United States Patent
Kim (10) Patent No.: US 11,795,959 B2
(45) Date of Patent: Oct. 24, 2023

(54) REMOTE CONTROL SMART BLOWER

(71) Applicant: TURBOWIN CO., LTD., Cheongju-si (KR)

(72) Inventor: Minsoo Kim, Daejeon (KR)

(73) Assignee: TURBOWIN CO., LTD., Cheongju-si (KR)

( * ) Notice: Subject to any disclaimer, the term of this patent is extended or adjusted under 35 U.S.C. 154(b) by 321 days.

(21) Appl. No.: 17/326,094

(22) Filed: May 20, 2021

(65) Prior Publication Data

US 2021/0372416 A1 Dec. 2, 2021

(30) Foreign Application Priority Data

May 29, 2020 (KR) .......................... 10-2020-0064797

(51) Int. Cl.
*F04D 27/00* (2006.01)
*F04D 13/06* (2006.01)
(Continued)

(52) U.S. Cl.
CPC ............ *F04D 27/001* (2013.01); *F04D 13/06* (2013.01); *F04D 15/0005* (2013.01);
(Continued)

(58) Field of Classification Search
CPC ............. F04D 15/0005; F04D 15/0088; F04D 27/001; F04D 27/004; F04D 27/007;
(Continued)

(56) References Cited

U.S. PATENT DOCUMENTS

| | | | |
|---|---|---|---|
| 2007/0110606 A1* | 5/2007 | Stock .................... | F04D 29/582 418/88 |
| 2012/0219399 A1* | 8/2012 | Suzuki .................. | F04D 27/005 415/1 |

(Continued)

FOREIGN PATENT DOCUMENTS

| | | |
|---|---|---|
| CN | 209181183 U | 7/2019 |
| KR | 10-0781298 B1 | 11/2007 |

(Continued)

*Primary Examiner* — Eldon T Brockman
*Assistant Examiner* — Andrew J Marien
(74) *Attorney, Agent, or Firm* — Rabin & Berdo, P.C.

(57) ABSTRACT

Disclosed is a remote control smart blower. More particularly, the remote control smart blower includes a blower chamber (100) compressing external air flowing inside and discharging the compressed air; and a blower controller chamber (200) forming a predetermined-high partition with the blower chamber (100) and being able to operate and monitor in real time the power and operation status of a blower (110) disposed and fixed in the blower chamber (100), in which a manager can check the operation status of the blower (110) installed and fixed at a site and control and manage the blower (110) in real time using an exclusive terminal not only at the site, but regardless of the distance due to the blower controller chamber (200), whereby safety of operation and ease of management of the blower (110) are maximized.

Therefore, the present invention not only maximizes the usability of the blower (110) installed in a site, but also allows a manager to check the operation status and operation schedule of the blower (110) in real time regardless of the distance and to manage and control the operation condition and operation schedule according to the situation, whereby improving the ease and expertise of the blower (110).

3 Claims, 5 Drawing Sheets

(51) Int. Cl.
- *F04D 15/00* (2006.01)
- *G05B 13/02* (2006.01)
- *H04L 67/12* (2022.01)
- *F04D 27/02* (2006.01)
- *G16Y 40/00* (2020.01)
- *F15B 13/04* (2006.01)

(52) U.S. Cl.
CPC ..... *F04D 15/0066* (2013.01); *F04D 15/0088* (2013.01); *F04D 27/004* (2013.01); *F04D 27/007* (2013.01); *F04D 27/02* (2013.01); *F04D 27/0223* (2013.01); *F04D 27/0261* (2013.01); *F04D 27/0284* (2013.01); *G05B 13/021* (2013.01); *G16Y 40/00* (2020.01); *H04L 67/12* (2013.01); *F05D 2270/304* (2013.01); *F05D 2270/3013* (2013.01); *F05D 2270/3061* (2013.01); *F05D 2270/335* (2013.01); *F15B 2013/0409* (2013.01)

(58) Field of Classification Search
CPC .. F04D 27/02; F04D 27/0223; F04D 27/0261; F04D 27/0284; G16Y 40/00; F05D 2270/3013; F05D 2270/3061; F05D 2270/335; F05D 2270/304; F05D 2270/303; F15B 2013/0409
See application file for complete search history.

(56) References Cited

U.S. PATENT DOCUMENTS

| | | | |
|---|---|---|---|
| 2018/0266425 A1* | 9/2018 | Seo | F04D 29/70 |
| 2019/0186496 A1* | 6/2019 | Monteith | F04D 25/088 |
| 2019/0264700 A1* | 8/2019 | Huggins | F04D 27/002 |
| 2022/0010801 A1* | 1/2022 | Kim | F04D 17/10 |

FOREIGN PATENT DOCUMENTS

| | | |
|---|---|---|
| KR | 10-0970719 B1 | 7/2010 |
| KR | 10-1616274 B1 | 4/2016 |
| KR | 10-1989588 B1 | 6/2019 |
| KR | 10-2019-0102806 A | 9/2019 |

* cited by examiner

REMOTE CONTROL SMART BLOWER

BACKGROUND OF THE INVENTION

Field of the Invention

The present disclosure relates to a remote control smart blower and, more particularly, a remote control smart blower that improves ease, expertise, and safety of management of a blower by providing both a housing for maximizing usability of a blower that is installed at a site and a system that enables a manager to check the operation status of a blower and control the operation condition of the blower in real time using an exclusive terminal not only at a site, but regardless of the distance.

Description of the Related Art

A blower is an apparatus for compressing a gas by a rotation of an impeller.

That is, the blower is a device that is installed on the industrial site, increases the pressure of the air sucked from the outside by a certain range, and discharges the compressed air to the industrial site.

Such a turbo machine has already been published in a variety of technologies and many kinds of turbo machines having a suitable shape and a specification suitable for the environment of the industrial site have been released.

Also, in order to increase the efficiency of the conventional blower, complex design changes for a shape or a cooling method of the impeller and a cooling means and techniques for improving the efficiency and cooling performance of the blower manufactured based on the same have been variously proposed.

However, even if a blower having excellent efficiency and performance is installed in the field, if management is not steadily performed, there is a problem in that efficiency and performance as well as safety are deteriorated.

Accordingly, an object of the present invention is to provide a housing capable of stably operating the blower and including a control system that manages the blower, which can solve the conventional problem.

Thus, as a prior art for a smart blower for remote control, "a blower" of Korea Patent registration No. 10-0781298 (hereinafter referred to as "Patent Literature 1") is disclosed.

It relates a blower that compresses and blows a large amount of air. A ventilator includes a receiving part, a case, a blower, an inverter, and a radiator. The case has an air inlet hole to introduce air into the receiving part. The blower is arranged in the receiving part of the case and has a motor and an impeller connecting to the motor, and compresses the air flowing from the air inlet hole and blows the air to the outside of the receiving part. The inverter is arranged in the receiving part of the case and is electrically connected to the blower to control the speed of the impeller. The radiator is connected to a cooling water channel in the blower to cool the blower. The radiator is arranged between the air inlet hole and the blower. The radiator emits heat included in the cooling water heated through the cooling water channel to the air flowing from the air inlet hole.

As further prior art, "a remote diagnosis apparatus based on wireless IoT" of Korea Patent publication No. 10-2019-0102806 (hereinafter referred to as "Patent Literature 2") is disclosed.

It relates to a remote diagnosis apparatus based on IoT includes a power supply unit supplying or cutting off power to a refrigerator; a communication unit communicating with an external management server; a power detection unit detecting a current or voltage of the refrigerator; and a control unit obtaining power information of the refrigerator at a preset time schedule to transmit the power information to the management server through the communication unit, receiving a control signal from the management server to cut off the power of the refrigerator through the power supply unit if the power information is out of a predetermined range. Accordingly, the amount of power of the refrigerator is monitored and the failure diagnosis can be quickly performed.

As described above, Patent Literature 1 is an invention for a blower and Patent Literature 2 is an invention for a device for managing a refrigerator based on IoT technology. Both prior arts are similar to and the same as the present invention in terms of the technical ideal and the technical field. In contrast to the present invention, some similar and identical technical concepts exist in the problems and solutions to be solved by the invention. However, the inventions having a similar or identical technical idea must have essential configurations.

That is, the technologies related to a management system for controlling a blower and a refrigerator using a communication network must have an essential basic configuration.

However, Patent Literatures 1 and 2 and the present invention are different in terms of a device, a specific solution for controlling the device, and a specific object and effect thereof.

Accordingly, the present invention is different from the conventional turbomachines including a conventional blower including the Patent Literature 1 and Patent Literature 2 and the management systems related technology for controlling the same. Also, the present invention seeks to achieve the technical features based on the problem to be solved by the invention (object of the invention), a solution means (element) for solving it, and the effect exerted by solving the same.

PATENT LITERATURE

Patent Literature 1: Korean Patent Registration No. 10-0781298 (Nov. 26, 2007)
Patent Literature 2: Korean Patent publication No. 10-2019-0102806 (Sep. 4, 2019)

SUMMARY OF THE INVENTION

The present disclosure has been made in an effort to solve the problems of the related art and an object of the present disclosure is to provide a housing that protects a blower from the outside and maximizes usability of the blower.

Another object of the present disclosure is to provide a housing including a remote control system that enables a manager to control and manage a blower installed at a site by checking the operation status of the blower in real time not only at the site, but regardless of the distance.

Another object of the present disclosure is to provide a housing including a blower remote control system that enables a developer that develops, manufactures, and sells a blower to process and analyze collected data to use the data as big data when developing a new blower, housing, and control system on the basis of various items of information (performance, efficiency, breakage type, and lifespan) obtained and collected by operating a control room that can monitor in real time the operation status of a delivered blower.

Further, it is possible to provide customer-fit services (maintenance, replacement of parts, etc.) by operating a control room.

According to an aspect of the invention to achieve the object described above, there is provided a remote control smart blower of the present disclosure including:

a blower chamber compressing external air flowing inside and discharging the compressed air; and a blower controller chamber forming a predetermined-high partition with the blower chamber and being able to operate and monitor in real time the power and operation status of a blower disposed and fixed in the blower chamber, in which a manager can check the operation status of the blower installed and fixed at a site and control and manage the blower in real time using an exclusive terminal not only at the site, but regardless of the distance due to the blower controller chamber, whereby safety of operation and ease of management of the blower are maximized.

At this time, the blower chamber includes:

a blower compressing air flowing inside from the outside;

a first external air inlet formed on the rear surface and enabling external air to flow into the blower chamber;

a blower chamber filter formed on the rear surface and preventing foreign substances from flowing into the blower chamber through the first external air inlet;

a blower chamber lock formed on a side of the rear surface and opening/closing the rear surface of the blower chamber so that the internal space can be managed;

a compressed air outlet formed on a side of the top and discharging the air compressed by the blower; and an external circulator preventing an increase of the temperature of the internal space by discharging in real time air and heat remaining inside to the outside.

The external circulator protrudes a predetermined height from a side on the top of the blower chamber, and forms:

an air-heat initial contact route against which the air and heat remaining in the blower chamber and rising primarily collide and that decreases the temperature of the remaining air and heat before they are discharged to the outside;

a first discharge route for discharging the air and heat coming in contact with and colliding against the air-heat initial contact route toward the front surface of the blower chamber; and a second discharge route for discharging the air and heat coming in contact with and colliding against the air-heat initial contact route toward the rear surface of the blower chamber, such that the inside of the blower chamber is easily managed, and the temperature of the internal space of the blower chamber and the site is quickly decreased by the external circulator, whereby the work environment is made pleasant.

The blower controller chamber includes:

a second external air inlet formed on the front surface and enabling external air to flow into the blower controller chamber;

a controller chamber filter formed on the front surface and preventing foreign substances from flowing into the blower controller chamber through the second external air inlet;

an operation status output bar formed on a side of the front surface and showing the operation status of the blower;

a blower controller chamber lock formed on a side of the front surface and opening/closing the front surface of the blower controller chamber so that the internal space can be managed;

a display panel formed on a side of the front surface and outputting in real time the operation status and the operation condition of the blower so that a manager can directly set them;

a power input unit formed on a side of the front surface and supplying necessary power to the blower controller chamber and the blower chamber;

a partition formed to have a predetermined height on the rear surface of an internal space and separating the blower controller chamber and the blower chamber;

a chamber connector communicating the blower controller chamber and the blower chamber with the partition therebetween, thereby securing the amount of air flowing into the blower and decreasing an increase of internal temperature through temperature exchange between the blower controller chamber and the blower chamber; and a blower control system enabling a manager to set the operation condition of the blower and manage and control the operation status of the blower through the display panel or an external exclusive terminal, such that it is possible to check and control the operation condition and status of the blower.

The blower control system includes:

a site control system enabling a manager to directly set the operation condition of the blower through the display panel at the site where the blower is installed; and a smart control system enabling the manager to set the operation condition of the blower installed at the site regardless of the distance, and to check the operation status in real time.

The smart control system includes:

a blower information exchange communication unit transmitting the real-time operation status of the blower, which is operating, and information acquired from the sensor unit to a manager, and enabling communication with the outside to be capable of receiving a specific signal transmitted from a manager; and an IoT system controller checking in real time the operation status of the blower, which is operating, through the blower information exchange communication unit, and enabling the manager to remotely control the blower using an exclusive terminal regardless of the distance, on the basis of IoT (Internet of Things) technology such that it is possible to enable a manager to check the operation status of the blower installed at a site using an exclusive terminal through the IoT system controller regardless of the distance, and to manage the real-time operation status of the blower by resetting and controlling the operation condition in consideration of various items of information about the blower checked and acquired.

In the meantime, it should be understood that the terminology or the words used in claims should not be interpreted in normally or lexically sense. It should be interpreted as meaning and concept consistent with the technical idea of the present invention, based on the principle that the inventor can properly define the concept of the term in order to describe its invention in the best way.

Therefore, the embodiments described in the present specification and the configurations shown in the drawings are only the most preferred embodiments of the present invention, and not all the technical ideas of the present invention are described. Therefore, it is to be understood that various equivalents and modifications are possible.

BRIEF DESCRIPTION OF THE DRAWINGS

The above and other objects, features and advantages of the present invention will be more apparent from the following detailed description taken in conjunction with the accompanying drawings, in which.

REFERENCE SIGNS LIST

1: remote control smart blower
100: blower chamber
110: blower
120: first external air inlet
130: blower chamber filter
140: blower chamber lock
150: compressed air outlet
160: external circulator
161: remaining air-heat contact module
170: abnormal status alarming unit
200: blower controller chamber
210: second external air inlet
220: controller chamber filter
230: operation status output bar
240: blower controller chamber lock
250: display panel
251: discharge pressure output module
252: flow rate output module
253: power consumption output module
254: RPM output module
255: filter pressure difference output module
256: internal temperature output module
257: intake temperature output module
258: discharge temperature output module
260: power input unit
270: partition
280: chamber connector
290: blower control system
291: site control system
291a: blower operation status data storage module
291b: mechanic system setting module
291b-1: discharge pressure setting element
291b-2: flow rate setting element
291b-3: power consumption setting element
291b-4: RPM setting element
291b-5: valve activation setting element
292: smart control system
292a: blower information exchange communication unit
292b: IoT system controller
292b-1: IoT blower mechanic controller
292b-1a: sensing unit control module
292b-1a-1: discharge pressure measurement sensor operation checking element 292b-1a-2: flow rate measurement sensor operation checking element
292b-1a-3: power consumption measurement sensor operation checking element
292b-1a-4: RPM measurement sensor operation checking element
292b-1a-5: internal pressure measurement sensor operation checking element
292b-1a-6: intake temperature measurement sensor operation checking element
292b-1a-7: discharge temperature measurement sensor operation checking element
292b-1a-8: valve opening/closing measurement sensor operation checking element
292b-1b: blower output control module
292b-1b-1: discharge pressure adjustment checking element
292b-1b-2: flow rate adjustment checking element
292b-1b-3: power consumption adjustment checking element
292b-1b-4: RPM adjustment checking element
292b-1b-5: valve opening/closing adjustment checking element
292b-1c: main power supply control module
292b-2: IoT blower data storage unit
292b-2a: normal operation data collection module
292b-2b: abnormal history collection module
292b-2c: maintenance history collection module
A: valve information output module
R1: air heat-initial contact route
R2: first discharge route
R3: second discharge route
SS: sensor unit
SS1: blower sensing module
SS1-1: discharge pressure sensing element
SS1-2: flow rate sensing element
SS1-3: power consumption sensing element
SS1-4: RPM sensing element
SS1-5: filter pressure difference sensing element
SS1-6: internal temperature sensing element
SS1-7: intake temperature sensing element
SS1-8: discharge temperature sensing element
SS1-9: valve status sensing element
SS2: blower sensing information communication module

DETAILED DESCRIPTION OF THE PREFERRED EMBODIMENT

The function, configuration, and operation of a remote control smart blower (1) are described hereafter in detail with the accompanying drawings.

Figure 1:
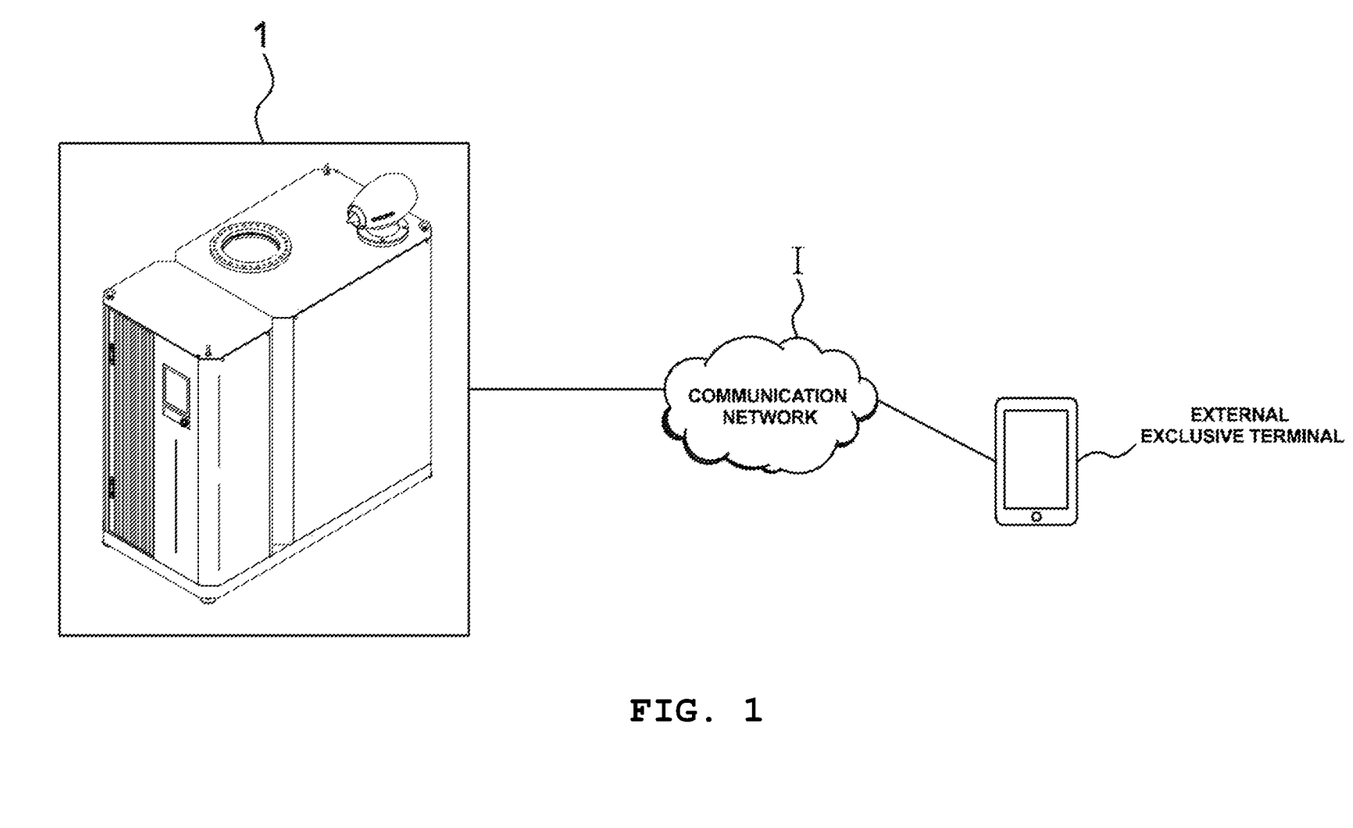
FIG. 1 is a conceptual diagram of a remote control smart blower of the present disclosure.
Figure 2:
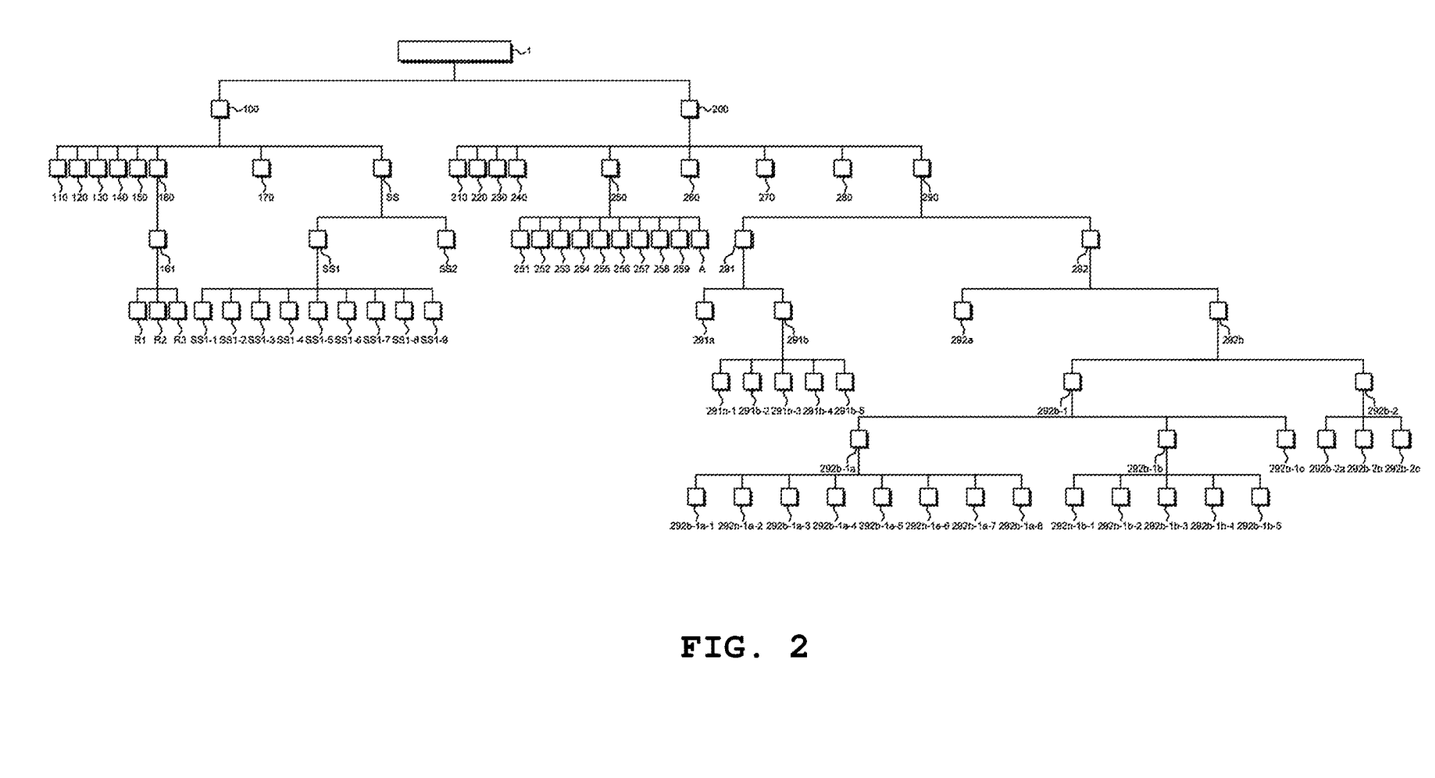
FIG. 2 is a configuration diagram of the remote control smart blower of the present disclosure.
Figure 3:
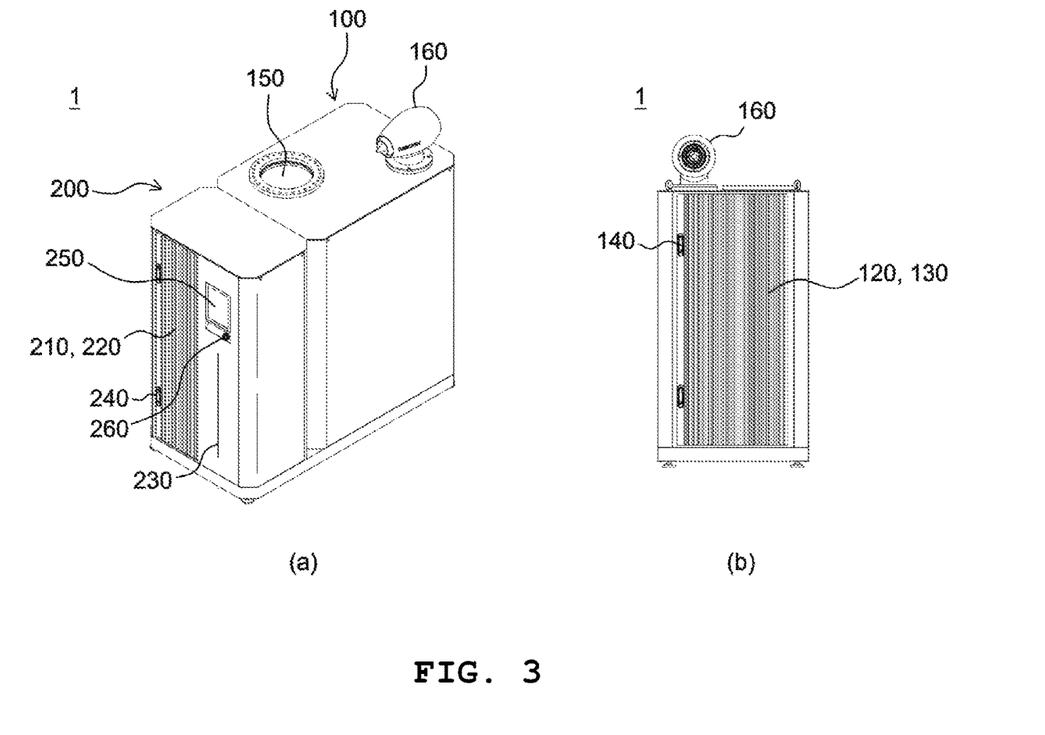
FIG. 3 is a diagram showing an embodiment of the remote control smart blower of the present disclosure.
Figure 4:
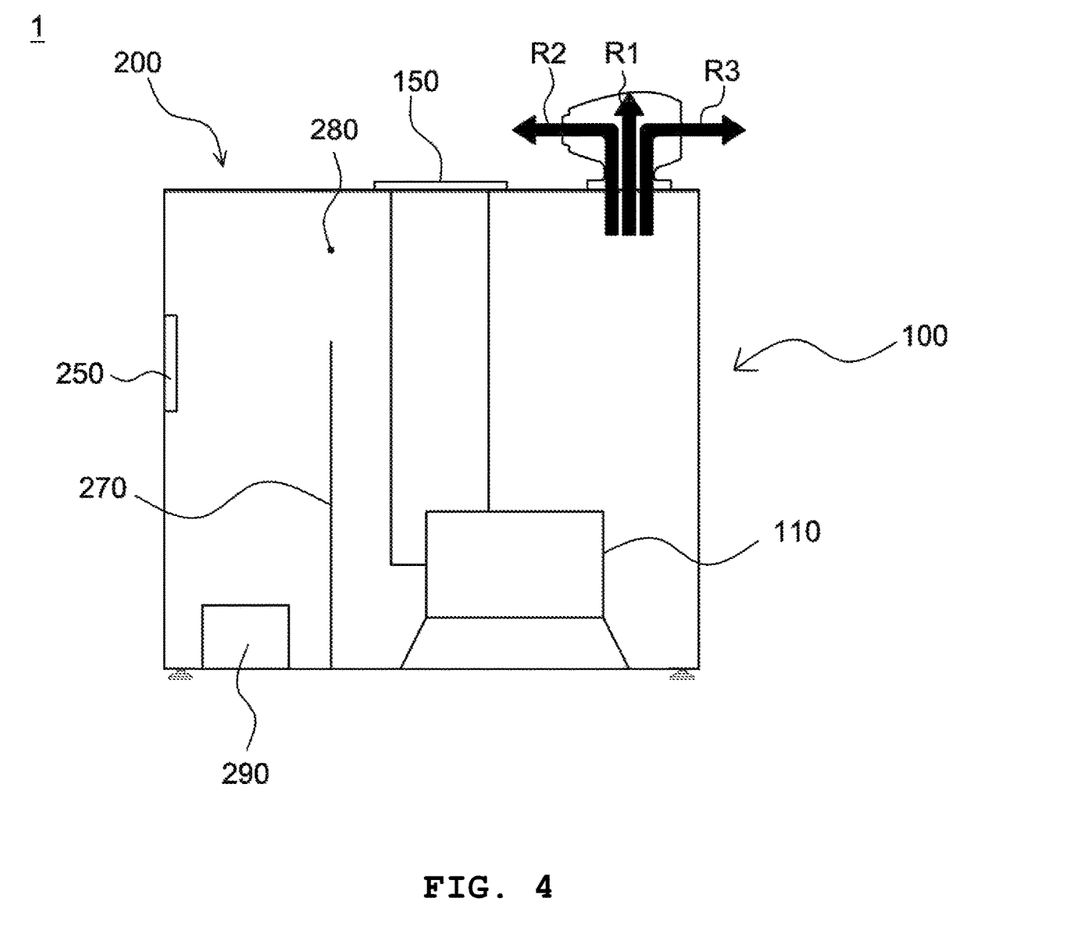
FIG. 4 is a cross-sectional view schematically showing the remote control smart blower of the present disclosure.

FIG. 1 is a conceptual diagram of a remote control smart blower of the present disclosure, FIG. 2 is a configuration diagram of the remote control smart blower of the present disclosure, FIG. 3 is a diagram showing an embodiment of the remote control smart blower of the present disclosure, and FIG. 4 is a cross-sectional view schematically showing the remote control smart blower of the present disclosure.

As shown in FIGS. 1 to 4, a remote control smart blower of the present disclosure includes:
a blower chamber (100) compressing external air flowing inside and discharging the compressed air; and
a blower controller chamber (200) forming a predetermined-high partition with the blower chamber (100) and being able to operate and monitor in real time the power and operation status of a blower (110) disposed and fixed in the blower chamber (100), in which a manager can check the operation status of the blower (110) installed and fixed at a site and control and manage the blower (110) in real time using an exclusive terminal not only at the site, but regardless of the distance due to the blower controller chamber (200), whereby safety of operation and ease of management of the blower (110) are maximized.

That is, the present disclosure relates to a smart blower that can protect a blower (110) to be installed at a site from the outside and enables the blower (110) to be more professionally used.

Further, the present disclosure enables a manager to easily check, manage, and control the operation status and the operation schedule of the blower (110) installed at a site and mechanical operations (power on-off and operation condition control) not only directly at the site, but through a communication network (I).

In more detail, in terms of a housing first, the blower chamber (100) in which the blower (110) and various sensors (SS) are installed includes:
  a blower (110) compressing air flowing inside from the outside;
  a first external air inlet (120) formed on the rear surface and enabling external air to flow into the blower chamber (100);
  a blower chamber filter (130) formed on the rear surface and preventing foreign substances from flowing into the blower chamber (100) through the first external air inlet (120);
  a blower chamber lock (140) formed on a side of the rear surface and opening/closing the rear surface of the blower chamber (100) so that the internal space can be managed;
  a compressed air outlet (150) formed on a side of the top and discharging the air compressed by the blower (110); and
  an external circulator (160) preventing an increase of the temperature of the internal space by discharging in real time air and heat remaining inside to the outside.

The external circulator (160) protrudes a predetermined height from a side on the top of the blower chamber (100), and
  forms: an air-heat initial contact route (R1) against which the air and heat remaining in the blower chamber (100) and rising primarily collide and that decreases the temperature of the remaining air and heat before they are discharged to the outside;
  a first discharge route (R2) for discharging the air and heat coming in contact with and colliding against the air-heat initial contact route (R1) toward the front surface of the blower chamber (100); and
  a second discharge route (R3) for discharging the air and heat coming in contact with and colliding against the air-heat initial contact route (R1) toward the rear surface of the blower chamber (100).

Accordingly, the inside of the blower chamber (100) is easily managed. Further, the temperature of the internal space of the blower chamber (100) and the site is quickly decreased by the external circulator (160), whereby the work environment is made pleasant.

That is, the external circulator (160) enables the remaining air and heat, which are discharged from the blower chamber (100), to maximally come in contact with the external circulator (160) immediately before they are completely discharged to outside through the first discharge route (R2) and the second discharge route (R3) so that the remaining air and heat are discharged outside with the temperature decreased, thereby preventing the work environment from being influenced by the remaining air and heat discharged from the blower chamber (100).

The external circulator (160) includes a remaining air-heat contact module (161) formed by coaxially stacking a plurality of circular discs in several steps with regular intervals therebetween at both ends such that the air and heat that are discharged from the blower chamber (100) are distributed and discharged into two branches through the first discharge route (R2) and the second discharge route (R3) and the air and heat that are discharged maximally come in contact with the air-heat initial contact route (R1) and the remaining air-heat contact module (161).

This is for quickly decreasing the temperature of the remaining air and heat that are discharged to the outside by inducing maximum contact of the remaining air and heat that are discharged to the outside using the characteristics of the shapes of the air-heat initial contact route (R1) and the remaining air-heat contact module (161).

Further, the blower (110) may further include a sensor unit (SS) disposed inside and outside the blower chamber (100) or the blower (110) and checking the operation status of the blower (110) in real time to be able to measure in real time the status of the internal space of the blower chamber (100) and the status of the blower (110).

The sensor unit (SS) includes:
  a blower sensing module (SS1) checking and acquiring information about various operation statuses of the blower (110); and
  a blower sensing information communication module (SS2) transmitting the real-time information of the blower (110) checked by the blower sensing module (SS1) to a blower control system (290).

The blower sensing module (SS1), for example, includes:
  a discharge pressure sensing element (SS1-1) sensing and measuring discharge pressure of the blower (110);
  a flow rate sensing element (SS1-2) sensing and measuring the flow rate of the blower (110);
  a power consumption sensing element (SS1-3) sensing and measuring power consumption of the blower (110);
  an RPM sensing element (SS1-4) sensing and measuring the RPM of the blower (110);
  a filter pressure difference sensing element (SS1-5) sensing and measuring filter pressure sensor of the blower (110);
  an internal temperature sensing element (SS1-6) sensing and measuring the temperature of the blower (110);
  an intake temperature sensing element (SS1-7) sensing and measuring the temperature of external air suctioned to the blower (110);
  a discharge temperature sensing element (SS1-8) sensing and measuring the temperature of compressed air discharged from the blower (110); and
  a valve status sensing element (SS1-9) sensing and measuring opening/closing and the degree of opening/closing of various valves formed in the blower (110).

Accordingly, various items of information acquired from the blower (110) are sensed, measured, and collected in real time and transmitted to the blower control system (290) through the blower sensing information communication module (SS2) (the blower controller chamber (200) transmits various items of information about the blower (110), which are transmitted to the blower control system (290) through a blower information exchange communication unit (292a), to a manager).

Meanwhile, the blower controller chamber (200) in which a system operating the blower (110) and controlling and managing the sensor unit (SS) are installed includes:

a second external air inlet (210) formed on the front surface and enabling external air to flow into the blower controller chamber (200);

a controller chamber filter (220) formed on the front surface and preventing foreign substances from flowing into the blower controller chamber (200) through the second external air inlet (210);

an operation status output bar (230) formed on a side of the front surface and showing the operation status of the blower (110);

a blower controller chamber lock (240) formed on a side of the front surface and opening/closing the front surface of the blower controller chamber 200 so that the internal space can be managed;

a display panel (250) formed on a side of the front surface and outputting in real time the operation status and the operation condition of the blower (110) so that a manager can directly set them;

a power input unit (260) formed on a side of the front surface and supplying necessary power to the blower controller chamber (200) and the blower chamber (100);

a partition (270) formed to have a predetermined height on the rear surface of an internal space and separating the blower controller chamber (200) and the blower chamber (100);

a chamber connector (280) communicating the blower controller chamber (200) and the blower chamber (100) with the partition (270) therebetween, thereby securing the amount of air flowing into the blower (110) and decreasing an increase of internal temperature through temperature exchange between the blower controller chamber (200) and the blower chamber (100); and a blower control system (290) enabling a manager to set the operation condition of the blower (110) and manage and control the operation status of the blower (110) through the display panel (250) or an external exclusive terminal.

Accordingly, it is possible to check and control the operation condition and status of the blower (110).

Figure 5:
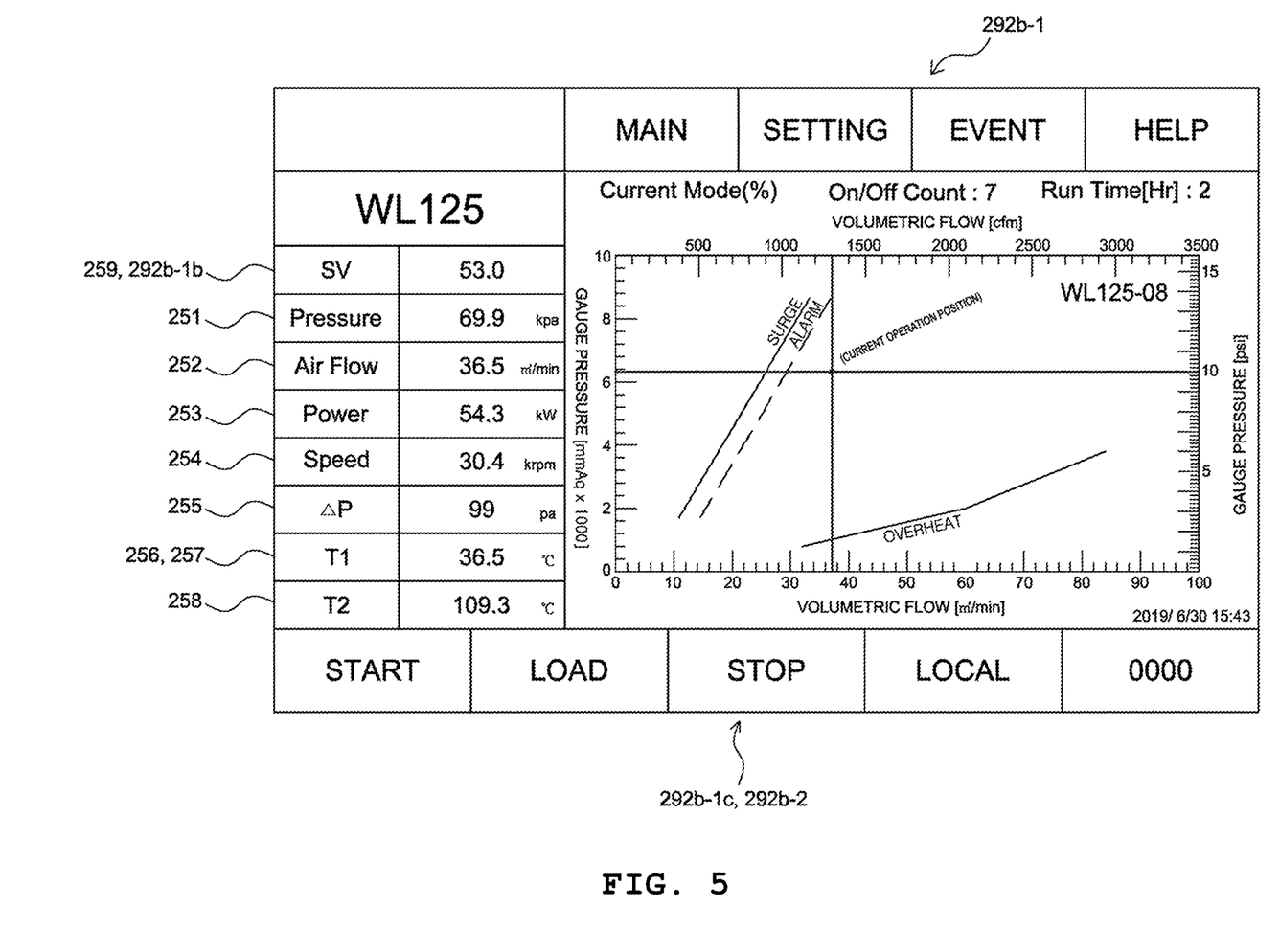
FIG. 5 shows an embodiment of a platform that is output to the display panel and the external exclusive terminal of the components of the remote control smart blower of the present disclosure.

The display panel (250) includes:

a discharge pressure output module (251) through which real-time discharge pressure information of the blower (110) is output;

a flow rate output module (252) through which real-time flow rate information of the blower (110) is output;

a power consumption output module (253) through which real-time power consumption information of the blower (110) is output;

an RPM output module (254) through which real-time RPM information of the blower (110) is output;

a filter pressure difference output module (255) through which real-time filter pressure difference information of the blower (110) is output;

an internal temperature output module (256) through which real-time temperature information of the blower (110) is output;

an intake temperature output module (257) through which real-time temperature information of external air suctioned to the blower (110) is output;

a discharge temperature output module (258) through which real-time temperature information of compressed air discharged from the blower (110) is output;

a valve information output module (A) through which information about opening/closing and the degree of opening/closing of various valves formed in the blower (110) is output; and a manager specific condition output module (259) through which information about specific operation conditions of the blower (110) set by the manager is output.

Accordingly, a manager can easily check the operation status and operation schedule of the blower (110) even at a site.

Further, the blower control system (290) includes:

a site control system (291) enabling a manager to directly set the operation condition of the blower (110) through the display panel (250) at the site where the blower (110) is installed; and a smart control system (292) enabling the manager to set the operation condition of the blower (110) installed at the site regardless of the distance, and to check the operation status in real time.

The site control system (291) includes:

a blower operation status data storage module (291*a*) storing real-time information about the blower (110) transmitted through the blower sensing information communication module (SS2); and a mechanic system setting module (291*b*) setting the operation status of the blower (110) on the basis of the real-time information about the blower (110) transmitted through the blower sensing information communication module (SS2) or selecting the operation condition of the blower (110) stored in advance in accordance with the use purpose so that the blower (110) is operated under a specific operation condition set and selected by a manager.

Accordingly, it is possible to safely manage the blower (110) by checking the operation status of the blower (110) in real time, thereby making the blower (110) stably operate.

The blower sensing information communication module (SS2) may be configured to communicate with the blower control system (290) in a wired or wireless type (communication can be performed in any type as long as the information acquired from the blower sensing module (SS2) is transmitted to the blower control system (290) through the blower sensing information communication module (SS2)).

Further, the mechanic system setting module (291*b*), for example, includes:

a discharge pressure setting element (291*b*-1) enabling a manager to freely set the discharge pressure of the blower (110);

a flow rate setting element (291*b*-2) enabling a manager to freely set the flow rate of the blower (110);

a power consumption setting element (291*b*-3) enabling a manager to freely set the power consumption of the blower (110);

an RPM setting element (291*b*-4) enabling a manager to freely set the RPM of the blower (110); and a valve activation setting element (291*b*-5) enabling a manager to freely set opening/closing and the degree of opening/closing of various valves formed in the blower (110).

Accordingly, a manager can set and control the operation condition of the blower (110) at a site or regardless of the distance.

That is, a manager controls, for example, the discharge pressure setting element (291*b*-1), the flow rate setting element (291*b*-2), the power consumption setting element (291*b*-3), the RPM setting element (291*b*-4), or the valve activation setting element (291*b*-5) at a site or on the basis of various items of information about the blower (110) transmitted from an external exclusive terminal through the blower information exchange communication unit (292*a*), thereby being able to control and set the operation condition of the blower (110) (obviously, the manager can set the operation condition in advance through the mechanic system setting module (291*b*) so that the blower (110) operates in accordance with the set operation condition).

Further, the smart control system (292) includes:
- a blower information exchange communication unit (292*a*) transmitting the real-time operation status of the blower (110), which is operating, and information acquired from the sensor unit (SS) to a manager, and enabling communication with the outside to be capable of receiving a specific signal transmitted from a manager; and
- an IoT system controller (292*b*) checking in real time the operation status of the blower (110), which is operating, through the blower information exchange communication unit (292*a*), and enabling the manager to remotely control the blower (110) using an exclusive terminal regardless of the distance, on the basis of IoT (Internet of Things) technology.

Accordingly, it is possible to enable a manager to check the operation status of the blower (110) installed at a site using an exclusive terminal through the IoT system controller (292*b*) regardless of the distance, and to manage the real-time operation status of the blower (110) by resetting and controlling the operation condition in consideration of various items of information about the blower (110) checked and acquired.

In more detail, the IoT system controller (292*b*) includes:
- an IoT blower mechanic controller (292*b*-1) monitoring mechanical operation of the blower (110), and controlling and managing the mechanic operation, depending on situations; and
- an IoT blower data storage unit (292*b*-2) collecting and managing various items of information so that the IoT blower mechanic controller (292*b*-1) can be controlled and managed by a manager on the basis of various items of information acquired from the blower (110).

The IoT blower mechanic controller (292*b*-1) includes:
- a sensing unit control module (292*b*-1*a*) sensing and checking operation of various sensors (SS) installed at a side inside and outside of the blower chamber (100) and the blower (110) and whether the sensors (SS) are operated;
- a blower output control module (292*b*-1*b*) sensing, checking, and controlling the discharge pressure, flow rate, power consumption, and RPM of the blower (110) and opening/closing of a valve; and
- a main power supply control module (292*b*-1*c*) controlling on-off of main power that is supplied to the blower chamber (100) and the blower controller chamber (200) (that is, a manager can control all elements controlled by the site control system (291) through the communication network (I) using an exclusive terminal).

The IoT blower data storage unit (292*b*-2) includes:
- a normal operation data collection module (292*b*-2*a*) storing information about the normal operation status according to the operation schedule of the blower (110);
- an abnormal history collection module (292*b*-2*b*) storing information about an abnormal operation status generated in operation according to the operation schedule of the blower (110); and
- a maintenance history collection module (292*b*-2*c*) storing information about measures by a manager for abnormal operation such as changing and setting a specific operation condition, replacing parts, etc., in correspondence to an abnormal operation status of the blower (110).

Accordingly, the manager can control and manage the blower (110) such that the blower (110) can operate under the optimal condition in accordance with the operation schedule and situations by checking the operation status of the blower (110) and various items of information acquired in real time from the blower (110) through the communication network (I).

That is, the IoT blower mechanic controller (292*b*-1) is a component that generally controls the mechanic operation of the blower (110) by controlling the operation status of the blower (110), that is, the discharge pressure, flow rate, power consumption, and RPM of the blower (110), and opening/closing of the valve, and sensing and checking operation of various sensing units (SS) formed inside and outside the blower chamber (100) and the blower (110) and whether the sensing units (SS) are operated.

For example, the IoT blower mechanic controller (292*b*-1) may enable non-load or load operation, depending on situations, by controlling opening/closing of the valve. Further, the IoT blower mechanic controller (292*b*-1) may operate the blower (110) in accordance with the operation schedule while non-load and load operations are automatically changed in accordance with situations by setting in advance opening/closing and the degree of opening/closing of the valve when a specific operation condition is satisfied, in cooperation with the blower output control module (292*b*-1*b*).

Further, the IoT blower data storage unit (292*b*-2) is a component that collects and manages various items of information acquired from the blower (110) so that a manager can control the blower (110) under the optimal condition through the IoT blower mechanic controller (292*b*-1).

The IoT system controller (292*b*), for example, is described in more detail.

The sensing unit control module (292*b*-1*a*) includes:
- a discharge pressure measurement sensor operation checking element (292*b*-1*a*-1) sensing and checking operation of a discharge pressure measurement sensor formed in the blower (110) and whether the discharge pressure measurement sensor is operated;
- a flow rate measurement sensor operation checking element (292*b*-1*a*-2) sensing and checking operation of a flow rate measurement sensor formed in the blower (110) and whether the flow rate measurement sensor is operated;
- a power consumption measurement sensor operation checking element (292*b*-1*a*-3) sensing and checking operation of a power consumption measurement sensor formed in the blower (110) and whether the power consumption measurement sensor is operated;
- an RPM measurement sensor operation checking element (292*b*-1*a*-4) sensing and checking operation of an RPM measurement sensor formed in the blower (110) and whether the RPM measurement sensor is operated;
- an internal pressure measurement sensor operation checking element (292*b*-1*a*-5) sensing and checking operation of a temperature measurement sensor measuring the temperature of the blower (110) and whether the temperature measurement sensor is operated;
- an intake temperature measurement sensor operation checking element (292*b*-1*a*-6) sensing and checking operation of a temperature measurement sensor measuring the temperature of external air suctioned into the blower (110) and whether the temperature measurement sensor is operated;

a discharge temperature measurement sensor operation checking element (292b-1a-7) sensing and checking operation of a temperature measurement sensor measuring the temperature of compressed air discharged from the blower (110) and whether the temperature measurement sensor is operated; and a valve opening/closing measurement sensor operation checking element (292b-1a-8) sensing and checking operation of a sensor measuring opening/closing and the degree of opening/closing of various valves formed in the blower (110) and whether the sensor is operated.

Accordingly, it is possible to sense, measure, and collect in real time the operation status of the blower (110) and various items of information acquired from the blower (110), and to check whether the sensor unit (SS) reacts without an error.

Further, the blower output control module (292b-1b) includes:

a discharge pressure adjustment checking element (292b-1b-1) sensing and controlling the discharge pressure of the blower (110);

a flow rate adjustment checking element (292b-1b-2) sensing and controlling the flow rate of the blower (110);

a power consumption adjustment checking element (292b-1b-3) sensing and controlling the power consumption of the blower (110);

an RPM adjustment checking element (292b-1b-4) sensing and controlling the RPM of the blower (110); and a valve opening/closing adjustment checking element (292b-1b-5) sensing and controlling opening/closing of various valves formed in the blower (110).

Accordingly, it is possible to operate the blower (110) under the optimal condition by controlling not only output values for the discharge pressure, flow rate, power consumption, and RPM, but also opening/closing of the valve in accordance with the use purpose of the site where the blower (110) is installed and the real-time operation status of the blower (110).

Further, the present disclosure further includes an abnormal status alarming unit (170) that informs a manager of information about a problem through an alarm, which can be immediately checked at a site, and the communication network (I) when a problem is generated in the blower (110) and a problem is sensed so that the manager can immediately cope with the problem.

Accordingly, safety of the blower (110) can be maximized and the blower (110) can be stably operated.

As described above, the present disclosure provides a control and management system that protects the blower (110) from the outside, maximizes usability thereof, manages and controls the operation status of the blower (100) regardless of the distance using the communication network (I), and enables a manager to operate the blower (110) under the optimal condition in accordance with the use purpose of each site where the blower (110) is installed.

For reference, FIG. 5 shows an embodiment of a platform that is output to the display panel and the external exclusive terminal of the components of the remote control smart blower of the present disclosure.

Further, the 'manager' stated in the present disclosure is an example of a worker and a manager at a site, an exclusive terminal having a display capable of outputting various items of information that can be carried by a worker and a manager at a site, and a control room, and may be defined as a meaning that generally refers to an object that can be supplied with information of the blower (110) in real time from the blower (110) or can control and manage the blower by transmitting information.

That is, for example, it may be defined as an individual or an agency that can control the blower (110) such as a worker at a site, a manager, a maintenance company, a manufacturer, and a developer.

Further, the blower chamber filter (130) and the controller chamber filter (220) can be replaced at an appropriate time by a manager on the basis of information acquired from the filter pressure difference sensing element (SS1-5).

Further, the operation status output bar (230), for example, outputs blue when it is operated, outputs white when it is stopped, and outputs red when there is a problem, using an LED such that a manager at a site immediately recognizes the status of the blower (110).

Further, the site control system (291) makes it possible to manage the operation of the blower (110) at a site.

The smart control system (292) transmits operation information of the blower (110) to the outside and manages the operation of the blower (110) on the basis of an instruction about operation of the blower (110) received from an external exclusive terminal.

In the configuration and operations, according to the present invention described above, 1. Usability of the blower is maximized.

The usability of the blower is to prevent foreign substances except for the air from flowing into the blower using the blower chamber filter and the controller chamber filter, quickly decrease an increase in temperature of the internal space by discharging air and heat in the internal space, in which the blower is installed, through the external circulator, enable a manager to easily and completely manage the internal space through the blower chamber lock and the blower controller chamber lock (stabilize and maintain the blower control system, maintain the blower, replace the blower chamber filter, replace the controller chamber filter, etc.), enable a manager and a worker at the site to intuitionally know operation and stop of the blower through the operation status output bar, induce circulation of air and heat in the internal space such that the temperature of the internal space quickly decreases while sufficiently securing the amount of external air flowing into the blower through the chamber connector, and check and set in real time the discharge pressure, flow rate, power consumption, RPM, pressure difference, intake temperature, discharge temperature, performance of gauge pressure-volume flow rate relationship of the blower, etc. through the display panel such that safe and stable operation is achieved.

2. Further, a manager can control and manage the blower by checking the operation status of the blower installed at a site not only at the site, but regardless of the distance.

That is, a manager safely and stably operates the blower by checking in real time the current operation information such as the discharge pressure, flow rate, power consumption, RPM, pressure difference, intake temperature, discharge temperature, performance of gauge pressure-volume flow rate relationship of the blower, using an exclusive terminal regardless of the distance.

3. Further, since a manager can easily check the operation status of the blower in real time, it is possible to operate the blower under the optimal operation condition by appropriately changing the operation status in accordance with situations and purposes at any time.

4. Further, since the operation status of the blower is checked in real time so that the operation range can be stably maintained, the blower is protected in advance from a surge or a problem and securing temporary suspension not scheduled (not in the operation schedule) is minimized, thereby maximizing consistency of a line and productivity.

5. In order that a developer that develops, manufactures, and sells a blower can process and analyze collected data to use the data as big data when developing a new blower, housing, and control system on the basis of various items of information (performance, efficiency, breakage type, and lifespan) obtained and collected by operating a control room that can monitor in real time the operation status of a delivered blower, it is possible to store, accumulate, and provide various data such as operation data and problem data (operation data, problem data, maintenance data, etc.) of all delivered blowers.

That is, since a manager is enabled to easily manage the blower, check the real-time operation status using a communication network anywhere regardless of the distance, and control and manage the control on the basis of the operation status, the manager is enabled to monitor all delivered blowers at a control room, whereby it is possible to accumulate various items of information about the blower. Further, it is possible to maximize satisfaction and reliability about post-management by immediately dealing with problems for customers. So, the present disclosure can be considered as a very effective invention.

It will be apparent to those skilled in the art that various modifications and variations can be made in the present invention without departing from the spirit or scope of the invention as defined in the appended claims.

This invention can be implemented in many different forms without departing from technical aspects or main features. Therefore, the implementation examples of this invention are nothing more than simple examples in all respects and will not be interpreted restrictively.

INDUSTRIAL APPLICABILITY

The present invention relates to a remote control smart blower, it can be applied to a manufacturing business of manufacturing a housing that protects the blower from the outside and a sales business thereof, and it can contribute to an improvement in various industrial fields such as a software field that includes a function to manage and control operating conditions and operation schedules regardless of distance and provides a stabilized platform capable of manufacturing and building a system that controls and manages the blower, overall machines related to blowers, and a blower and information technology industry in which ICT and IoT technologies are grafted.

What is claimed is:
1. A remote control smart blower (1) comprising:
a blower chamber (100) compressing external air flowing inside and discharging a compressed air; and
a blower controller chamber (200) forming a predetermined-high partition with the blower chamber (100) and being able to operate and monitor in real time a power and operation status of a blower (110) disposed and fixed in the blower chamber (100),
wherein the blower controller chamber (200) includes:
a blower control system (290) enabling a manager to set an operation condition of the blower (110) disposed and fixed in the blower chamber (100) and to manage and control an operation status of the blower (110) through a display panel (250) or an external exclusive terminal to be capable of checking and controlling the operation condition and status of the blower (110),
wherein the blower control system (290) includes:
a site control system (291) enabling the manager to directly set the operation condition of the blower (110) through the display panel (250) at a site where the blower (110) is installed; and
a smart control system (292) enabling the manager to set the operation condition of the blower (110) installed at the site regardless of a distance, and to check the operation status in real time,
wherein the smart control system (292) includes:
a blower information exchange communication unit (292a) transmitting a real-time operation status of the blower (110), which is operating, and information acquired from a sensor unit (SS) to the manager, and enabling communication with an outside to be capable of receiving a specific signal transmitted from the manager; and
an IoT system controller (292b) checking in real time the operation status of the blower (110), which is operating, through the blower information exchange communication unit (292a), and enabling the manager to remotely control the blower (110) using the exclusive terminal regardless of the distance, on a basis of IoT (Internet of Things) technology,
in order to enable the manager to check the operation status of the blower (110) installed at the site using the exclusive terminal through the IoT system controller (292b) regardless of the distance, and to manage the real-time operation status of the blower (110) by resetting and controlling the operation condition in consideration of information about the blower (110) checked and acquired,
wherein the IoT system controller (292b) includes:
an IoT blower mechanical controller (292b-1) monitoring mechanical operation of the blower (110), and controlling and managing the mechanical operation, depending on situations; and
an IoT blower data storage unit (292b-2) collecting and managing information such that the IoT blower mechanical controller (292b-1) can be controlled and managed on a basis of information about a discharge pressure, a flow rate, a power consumption, an RPM, a temperature, a temperature of external air, a temperature of compressed air, opening/closing and a degree of opening/closing of valves that are acquired from the blower,
wherein the IoT blower mechanical controller (292b-1) includes:
a sensing unit control module (292b-1a) sensing and checking operation of sensors (SS) installed at a side inside and outside of the blower chamber (100) and the blower (110) whether the sensors (SS) are operated;
a blower output control module (292b-1b) sensing checking, and controlling the discharge pressure, the flow rate, the power consumption, and the RPM of the blower and the opening/closing of the valves; and
a main power supply control module (292b-1c) controlling on-off of main power that is supplied to the blower chamber (100) and the blower controller chamber (200), wherein the sensing unit control module (292b-1a) includes:

a discharge pressure measurement sensor operation checking element (292b-1a-1) sensing and checking operation of a discharge pressure measurement sensor formed in the blower (110) and whether the discharge pressure measurement sensor is operated;

a flow rate measurement sensor operation checking element (292b-1a-2) sensing and checking operation of a flow rate measurement sensor formed in the blower (110) and whether the flow rate measurement sensor is operated;

a power consumption measurement sensor operation checking element (292b-1a-3) sensing and checking operation of a power consumption measurement sensor formed in the blower (110) and whether the power consumption measurement sensor is operated;

an RPM measurement sensor operation checking element (292b-1a-4) sensing and checking operation of an RPM measurement sensor formed in the blower (110) and whether the RPM measurement sensor is operated;

an internal temperature measurement sensor operation checking element (292b-1a-5) sensing and checking operation of a blower temperature measurement sensor measuring the temperature of the blower (110) and whether the blower temperature measurement sensor is operated;

an intake temperature measurement sensor operation checking element (292b-1a-6) sensing and checking operation of an external air temperature measurement sensor measuring the temperature of the external air suctioned into the blower (110) and whether the external air temperature measurement sensor is operated;

a discharge temperature measurement sensor operation checking element (292b-1a-7) sensing and checking operation of a compressed air temperature measurement sensor measuring the temperature of the compressed air discharged from the blower (110) and whether the compressed air temperature measurement sensor is operated; and a valve opening/closing measurement sensor operation checking element (292b-1a-8) sensing and checking operation of a sensor measuring the opening/closing and the degree of opening/closing of the valves formed in the blower (110) and whether the sensor is operated, in order to sense, measure, and collect in real time the discharge pressure, the flow rate, the power consumption, and the RPM of the blower, the operation status of the opening/closing of the valves, and information acquired from the blower (110), and in order to check whether the sensor unit (SS) reacts without an error by sensing and checking an operation of the sensor unit (SS) formed inside and outside the blower chamber (100) and the blower (110) and whether the sensor unit operates, wherein the blower output control module (292b-1b) includes:

a discharge pressure adjustment checking element (292b-1b-1) sensing and controlling the discharge pressure of the blower (110);

a flow rate adjustment checking element (292b-1b-2) sensing and controlling the flow rate of the blower (110);

a power consumption adjustment checking element (292b-1b-3) sensing and controlling the power consumption of the blower (110);

an RPM adjustment checking element (292b-1b-4) sensing and controlling the RPM of the blower; and a valve opening/closing adjustment checking element (292b-1b-5) sensing and controlling the opening/closing of the valves formed in the blower (110), in order to operate the blower (110) under an optimal condition by controlling not only output values for the discharge pressure, the flow rate, the power consumption, and the RPM, but also the opening/closing of the valves in accordance with a use purpose of the site where the blower (110) is installed and the real-time operation status of the blower (110), wherein the IoT blower data storage unit (292b-2) includes:

a normal operation data collection module (292b-2a) storing information about the normal operation status according to an operation schedule of the blower (110);

an abnormal history collection module (292b-2b) storing information about an abnormal operation status generated in operation according to the operation schedule of the blower (110); and a maintenance history collection module (292b-2c) storing information about measures by the manager for abnormal operation such as changing and setting a specific operation condition and replacing parts, in correspondence to the abnormal operation status of the blower (110), in order to enable the manager to control and manage the blower (110) such that the blower can operate under the optimal condition in accordance with the operation schedule and situations by checking the operation status of the blower (110) and information acquired in real time from the blower (110) through a communication network, and in order to enable the manager to check, control, and manage the operation status of the blower (110) disposed and fixed at the site in real time, using the exclusive terminal not only at the site, but regardless of distance, thereby maximizing safety of operation and ease of management of the blower (110).

2. The remote control smart blower of claim 1, wherein the blower chamber includes:

the blower (110) compressing air flowing inside from the outside;

a first external air inlet (120) formed on a rear surface and enabling the external air to flow into the blower chamber (100);

a blower chamber filter (130) formed on the rear surface and preventing foreign substances from flowing into the blower chamber (100) through the first external air inlet (120);

a blower chamber lock (140) formed on a side of the rear surface and opening/closing the rear surface of the blower chamber (100) so that an internal space can be managed;

a compressed air outlet (150) formed on a side of a top and discharging air compressed by the blower (110); and an external circulator (160) preventing an increase of a temperature of the internal space by discharging in real time air and heat remaining inside to the outside, wherein the external circulator (160) protrudes a predetermined height from the side on the top of the blower chamber (100), and forms: an air heat-initial contact route (R1) which the air and heat remaining in the blower chamber (100) primarily hit when rising and that decreases a temperature of the remaining air and heat before they are discharged to the outside;

a first discharge route (R2) for discharging the air and heat coming in contact with and hitting against the air heat-initial contact route (R1) toward a front surface of the blower chamber (100); and a second discharge route (R3) for discharging the air and heat coming in contact with and hitting against the air heat-initial contact route (R1) toward the rear surface of the blower chamber (100), such that the inside of the blower chamber (100) is easily managed, and the temperature of the internal space of the blower chamber (100) and the site is quickly decreased by the external circulator (160), whereby a work environment is made pleasant.

3. The remote control smart blower of claim 1, wherein the blower controller chamber (200) includes:

a second external air inlet (210) formed on a front surface and enabling the external air to flow into the blower controller chamber (200);

a controller chamber filter (220) formed on the front surface and preventing foreign substances from flowing into the blower controller chamber (200) through the second external air inlet (210);

an operation status output bar (230) formed on a side of the front surface and showing the operation status of the blower (110);

a blower controller chamber lock (240) formed on the side of the front surface and opening/closing the front surface of the blower controller chamber (200) so that an internal space can be managed;

the display panel (250) being formed on the side of the front surface and outputting in real time the operation status and the operation condition of the blower (110) so that the manager can directly set them;

a power input unit (260) formed on the side of the front surface and supplying necessary power to the blower controller chamber (200) and the blower chamber (100);

a partition (270) formed to have a predetermined height on a rear surface of the internal space and separating the blower controller chamber (200) and the blower chamber (100); and a chamber connector (280) communicating the blower controller chamber (200) and the blower chamber (100) with the partition therebetween, thereby securing the amount of air flowing into the blower (110) and decreasing an increase of internal temperature through temperature exchange between the blower controller chamber (200) and the blower chamber (100);

wherein the blower control system (290) enables the manager to set the operation condition of the blower (110) and manage and control the operation status of the blower (110) through the display panel (250) or the external exclusive terminal, in order to be able to check and control the operation condition and status of the blower (110).

\* \* \* \* \*